United States Patent [19]
Ito

[11] Patent Number: 5,276,686
[45] Date of Patent: Jan. 4, 1994

[54] MOBILE RADIO COMMUNICATION SYSTEM HAVING MOBILE BASE AND PORTABLE DEVICES AS A MOBILE STATION

[75] Inventor: Koichi Ito, Tokyo, Japan

[73] Assignee: Kabushiki Kaisha Toshiba, Kawasaki, Japan

[21] Appl. No.: 778,272

[22] Filed: Oct. 17, 1991

[30] Foreign Application Priority Data

Oct. 17, 1990 [JP] Japan ................................ 2-277680

[51] Int. Cl.⁵ .............................................. H04J 3/16
[52] U.S. Cl. .................................... 370/95.1; 379/59; 455/33.1
[58] Field of Search ................... 370/95.1, 95.3, 85.13, 370/85.14; 455/58.1, 58.2, 33.1; 379/60, 61, 62, 63, 59

[56] References Cited

U.S. PATENT DOCUMENTS

| | | | |
|---|---|---|---|
| 4,056,779 | 11/1977 | Toler | 455/58.1 |
| 4,659,878 | 4/1987 | Dinkins | 370/71 |
| 4,894,856 | 1/1990 | Nakanishi et al. | 455/58.2 |
| 5,133,001 | 7/1992 | Böhm | 455/33.1 |
| 5,134,615 | 7/1992 | Freeburg et al. | 370/95.3 |

FOREIGN PATENT DOCUMENTS

WO8904569 5/1989 PCT Int'l Appl.
2241850 9/1991 United Kingdom.

Primary Examiner—Douglas W. Olms
Assistant Examiner—Shick Hom
Attorney, Agent, or Firm—Banner, Birch, McKie & Beckett

[57] ABSTRACT

A mobile radio communication system according to the invention comprises a base station to be connected with a communication network by way of a wired communication path, a mobile base device to be connected with the base station by way of a first radio channel selected from a plurality of first radio channels and a portable device to be connected with the mobile base device by way of a second radio channel selected from a plurality of second radio channels. Each of the first and second radio channels defined by a radio frequency and a time slot. The mobile base device comprises first, second and third connection control circuits. The first connection control circuit is used to select an idle first radio channel out of the first radio channels in cooperation with the base station and connect the mobile base device with the base station by the selected idle first radio channel. The second connection control circuit is used to select a radio channel having an idle time slot showing a specific relationship with the first radio channel selected by the first connection control circuit and connect the mobile base device and the portable device by the selected idle second radio channel. The third connection control circuit is used to connect the first and second radio channels and establish a telephone communication path between the base station and the portable device.

29 Claims, 8 Drawing Sheets

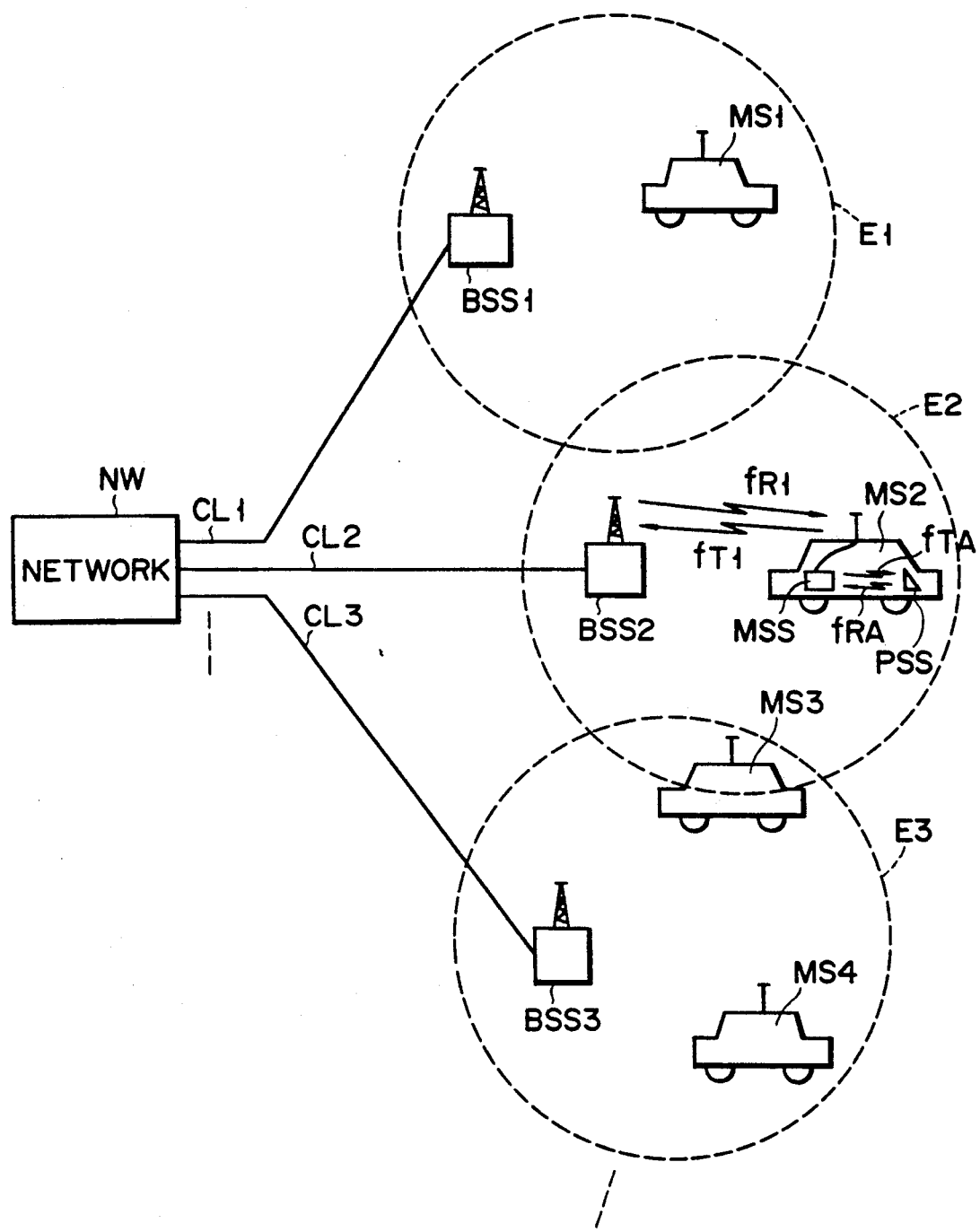
F I G. 1

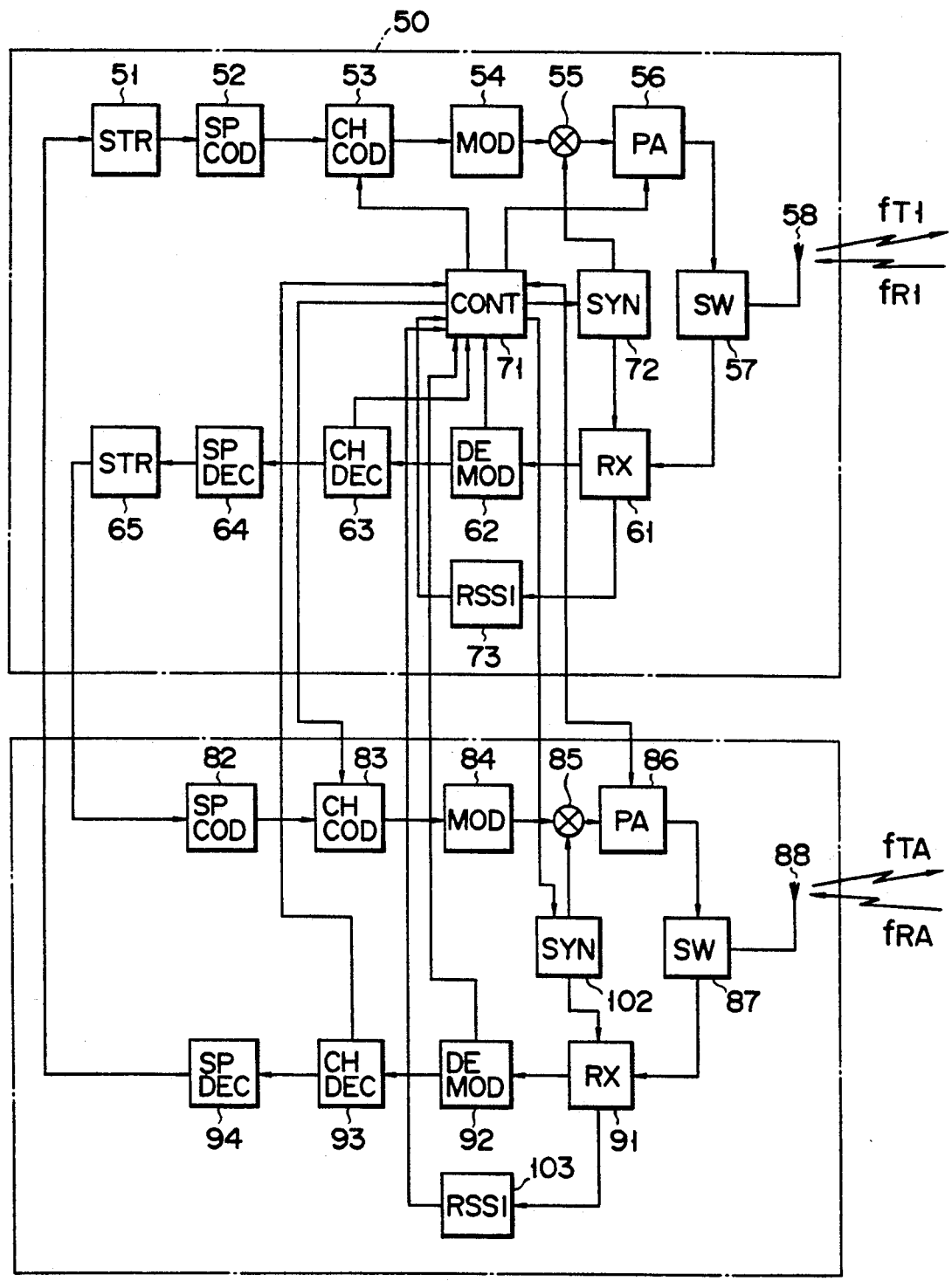
F I G. 3

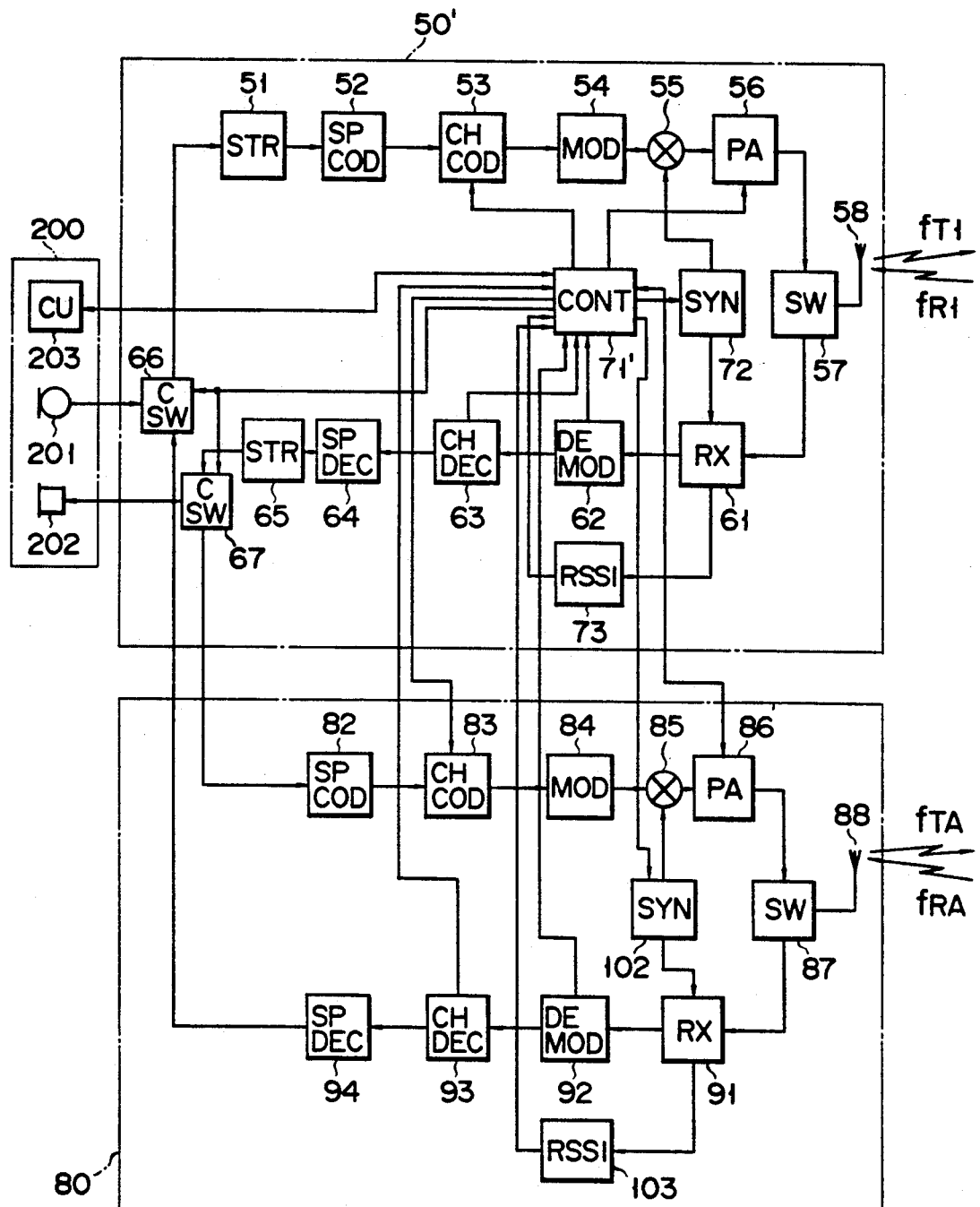
F I G. 9

MOBILE RADIO COMMUNICATION SYSTEM HAVING MOBILE BASE AND PORTABLE DEVICES AS A MOBILE STATION

BACKGROUND OF THE INVENTION

1. Field of the Invention

This invention relates to a radio communication system to be used as an automobile telephone system, a portable radio telephone system or a cordless telephone system and more particularly it relates to a radio communication system that enables installation of mobile base devices and portable device.

2. Description of the Related Art

A cellular type automobile telephone system has been known as a mobile radio communication system. Such a system normally comprises a control station, a plurality of base stations and a plurality of mobile stations, of which the control station is connected to a wired telephone network by way of a wire communication path. The base stations are centereden different radio communication zones. Each of the mobile stations is connected by a radio channel to the base station of a radio communication zone where it is currently located and further to a wire telephone network by way of the base station and the control station.

Such a known system normally employs a so-called frequency division multiple access (FDMA) technique for connection between a base station and each of the mobile stations that belong to it. FDMA is a technique in which a number of radio frequencies are shared by a base station and a plurality of mobile stations. For communication between a base station and a mobile station, the base station picks up an idle radio frequency whenever it calls or is called and then, if the call is successful, the calling and called stations are wirelessly connected by way of the picked up radio frequency. The operation of searching idle frequencies and assigning a particular frequency to a calling or called base station is conducted by the control station.

Now, each of the mobile stations of an automobile telephone system is equipped with an automobile telephone main unit and peripheral equipment including a handset assembly. An automobile telephone main unit comprises radio transmission circuits, control circuits and other circuits. A handset assembly normally comprises a cradle and a handset, which in turn comprises a telephone transmitter, a receiver and a console unit. A console unit in turn comprises dial key, hook switch, an LCD display and other components. The automobile telephone main unit and the handset assembly are connected by a signal cord. The cradle and the handset are connected by a curled cord.

With such an arrangement, the curled cord can constitutes an annoying obstacle when the driver drives and speaks into the telephone transmitter simultaneously. Moreover, the handset cannot be moved away beyond a limit posed by the curled wire, meaning that a passenger sitting on the front or rear passenger seat is compelled to stand up or take a crouching posture if he or she wants to speak over the phone.

While the handset assembly of a conventional mobile station is placed within the passenger cabin of a car, the automobile telephone main unit is normally arranged in the trunk of the car. The signal cord connecting the telephone main unit and the handset assembly should be carefully arranged so as not to aesthetically damage the appearance of the car, entailing a troublesome work to be done within a narrow space of the car.

SUMMARY OF THE INVENTION

It is therefore an object of the present invention to provide a mobile radio communication system that wirelessly connects not only between a base station and a mobile station but also between a mobile station, or a mobile base device, and a portable device by a radio channel in order to eliminate the necessity of wiring the mobile base device and portable device and enhance the maneuverability of an automobile telephone handset.

Another object of the present invention is to provide a mobile radio communication system that can appropriately allocate radio channels for secure communication between base stations and mobile base devices and between mobile base devices and portable devices without causing interference and other troubles among radio channels.

According to the invention, the above objects are achieved by providing a mobile radio communication system comprising a base station to be connected with a communication network by way of a wired communication path, a mobile base device, to be connected with the base station by way of a first radio channel selected from a plurality of first radio channels, and a portable device to be connected with the mobile base device by way of a second radio channel selected from a plurality of second radio channels. Said mobile base device is provided with first, second and third connection control means. The mobile base device cooperates with the base station to search an idle radio channel out of the first radio channels by using the first connection means so that the base station and the mobile base device are mutually connected by way of the idle first radio channel. Then, the second connection means is used to search an idle radio channel out of the second radio channels that has a definite relationship with the time slot of the selected idle first radio channel so that the mobile base device and a portable device are mutually connected by way of said selected idle second radio channel. The third connection means is used to connect the selected first and second radio channels to establish a communication through path between the base station and the portable device.

In a mobile radio communication system according to the invention and having a configuration as described above, a radio channel can be established not only between the base station and a mobile base device but also between a mobile base device and a portable device for mutual communication. If such a system is used for an automobile telephone, connection between an automobile telephone main unit that operates as a mobile base device and a handset assembly that constitutes a portable device does not involve a signal cord nor curled cord to consequently enhance the maneuverability of the telephone handset and eliminate any possible nuisance to the driver due to the curled cord. Moreover, with such a system, a passenger on the rear seat can speak into the telephone transmitter of the handset without leaving the seat. Since no signal cord needs to be laid between an automobile telephone main unit and a handset assembly, the work of installing an automobile telephone terminal can be significantly simplified.

According to the invention, a second radio channel is selected as a function of the time slot of a selected first radio channel. Therefore, the selected second radio channel is always appropriate for a secure communication path between the base station and the portable device and never constitutes a source of interference and/or other troubles.

The effect of a mobile radio communication system according to the invention will be particularly remarkable when the transmission time slot of the first radio channel and that of the second radio channel are selected with a difference of timing so that any two different operations of signal transmission may not take place simultaneously in a mobile base device and consequently occurrence of any undesirable spurious transmission output may be effectively avoided. Besides, the peak value of energy consumption by a mobile base device may be reduced to alleviate the load for power supply.

A system according to the invention may find a variety of applications. In a first conceivable application of a system according to the invention, a mobile base device may be constituted by an automobile telephone main unit installed in a car and a portable device may correspond to a portable radio telephone handset to be used with the main unit in a mobile radio communication system according to the invention. The portable radio telephone handset is connected with the automobile telephone main unit by a radio channel to set up a communication channel leading to a telephone network. It is a known fact that a conventional portable radio telephone handset arranged in a car normally needs to be taken out of the car and placed somewhere outside the car or an adaptor should be put to it in order to make it operable relative to a matching telephone main unit in the car. A portable radio telephone handset of a system according to the invention, however, is not required to be placed outside the car nor does it need an adaptor to be put on it to become operable.

Alternatively in a second possible application that uses a system according to the invention for a cordless telephone system, a mobile base device, may be constituted by a stationary unit of a cordless telephone system while a portable device may correspond to a cordless telephone handset. In a cordless telephone system, stationary telephone units are connected to a telephone exchange by way of subscribers' wire lines and each of the stationary units is connected to a handset by way of a radio channel. With a system according to the invention, additional stationary telephone units can be wirelessly connected to a telephone exchange without incurring any additional cost of installing new subscribers' lines and/or removing existing subscribers' lines.

In a third possible application of a system according to the invention, a mobile base device and a portable device may respectively correspond to an automobile telephone main unit and a cordless telephone handset. With such an arrangement, a codeless telephone handset whose service area is normally limited to the inside of a home or an office can be used in a car.

In preferable embodiment of the invention, a mobile base device searches out of the second radio channels a plurality of idle radio channels having a particular relationship with a single first radio channel in order to accommodate a number of portable devices to be connected to said first radio channel whenever such a search operation is requested by portable devices. Then, the mobile base device is firstly connected with the request issuing portable device by way of the selected respective second radio channels, which are subsequently connected with the first radio channel. With such an arrangement, those connected portable device can be branched from a wired telephone terminal of a telephone network and jointly participate in a common telephone talk that takes place among the connected terminals.

In another preferred embodiment of the invention, a mobile base device searches out of the second radio channels a plurality of idle radio channels to accommodate a number of portable devices to be mutually connected whenever such a search operation is requested by portable devices. Then, the mobile base device is connected with the request issuing portable devices by way of the selected respective second radio channels so that any two or more than two portable devices may be put through to one another. With such an arrangement, portable devices that belong to a mobile base device can operate as so many extension terminals branched from a local switch board, which is in fact a mobile base device.

In still another preferred embodiment of the invention, the length of a time slot in a second radio channel is made longer than the length of a time slot in a first radio channel. In other words, the number of time slots comprised in a time frame of a second radio channel is made smaller than that of time slots comprised in a time frame of a first radio channel. With such an arrangement, the bit rate of data transmitted by way of a second radio channel can be set to a relatively low level to allow the use of a CPU having a relatively low processing speed in a portable device. The circuit configuration of such a portable device can be made rather simple to reduce the cost of the station. Since the volume of traffic between a mobile base device and a portable device is by far smaller than that of traffic between a base station and a mobile base device, a radio channel connecting them does not need to have a large channel capacity. Therefore, a relatively small number of time slots in a second radio channel would not give rise to a channel shortage condition.

In a still another preferred embodiment of the invention a fixed communication device at least capable of calling other subscribers is connected to a mobile base device by way of a cable line for talking. Such a fixed communication device may be operated in different modes. In one possible mode, the fixed communication device and a wired telephone terminal is connected by way of a first radio channel and a telephone network. In another possible mode, the fixed communication device and a portable device is connected by way of a second radio channel to use the portable device as an extension terminal. In still another possible mode, a portable device and a wired telephone terminal connected to a telephone network are mutually connected to establish a communication path and then a fixed communication device is further connected to the establish communication path so that the three terminals can jointly participate in a telephone talk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic view of a first embodiment of the mobile radio communication system of the invention, illustrating its basic concept;

FIG. 3 is a block diagram showing the configuration of a mobile base device of the embodiment of FIG. 1;

FIG. 9 is a block diagram showing the configuration of a mobile base device in a fourth embodiment of the invention.

DETAILED DESCRIPTION OF THE PREFERRED EMBODIMENTS

1st Embodiment

FIG. 1 shows a schematic view of a first embodiment of the mobile radio communication system of the invention, which is an automobile telephone system.

This embodiment comprises as components a number of base stations BSS1 through BSSn and mobile stations MS1 through MSm. Said base stations BSS1 through BSSn are connected to a wire telephone network NW by way of respective cable lines CL1 through CLn and centered in different radio zones E1 through En. Each of the mobile stations MS1 through MSm comprises a mobile base device MSS and a portable device PSS. The mobile base device MSS is connected to a base station BSS that covers the radio zone E where it is located by way of a first radio channel, whereas the portable device PSS is connected to the mobile base device MSS by way of a second radio channel.

This embodiment utilizes a FDMA/TDMA technique for connection between a base station and a mobile base device as well as for connection between a mobile base device MSS and a portable device PSS. With a FDMA/TDMA technique, a number of radio frequencies are shared by a plurality of stations. These radio frequencies have a time division signal unit format where a time frame is divided into a number of time slots, e.g., six time slots TS1 through TS6. When a station tries to call another station in this system, the system searches for an idle radio frequency and then for an idle time slot of the radio frequency and assigns the selected time slot to the calling and called stations to establish a radio telephone communication channel between these stations.

Now, the stationary base stations BSS1 through BSSn mobile base devices MSS and portable devices PSS of this embodiment will be described further for their configurations.

Figure 2:
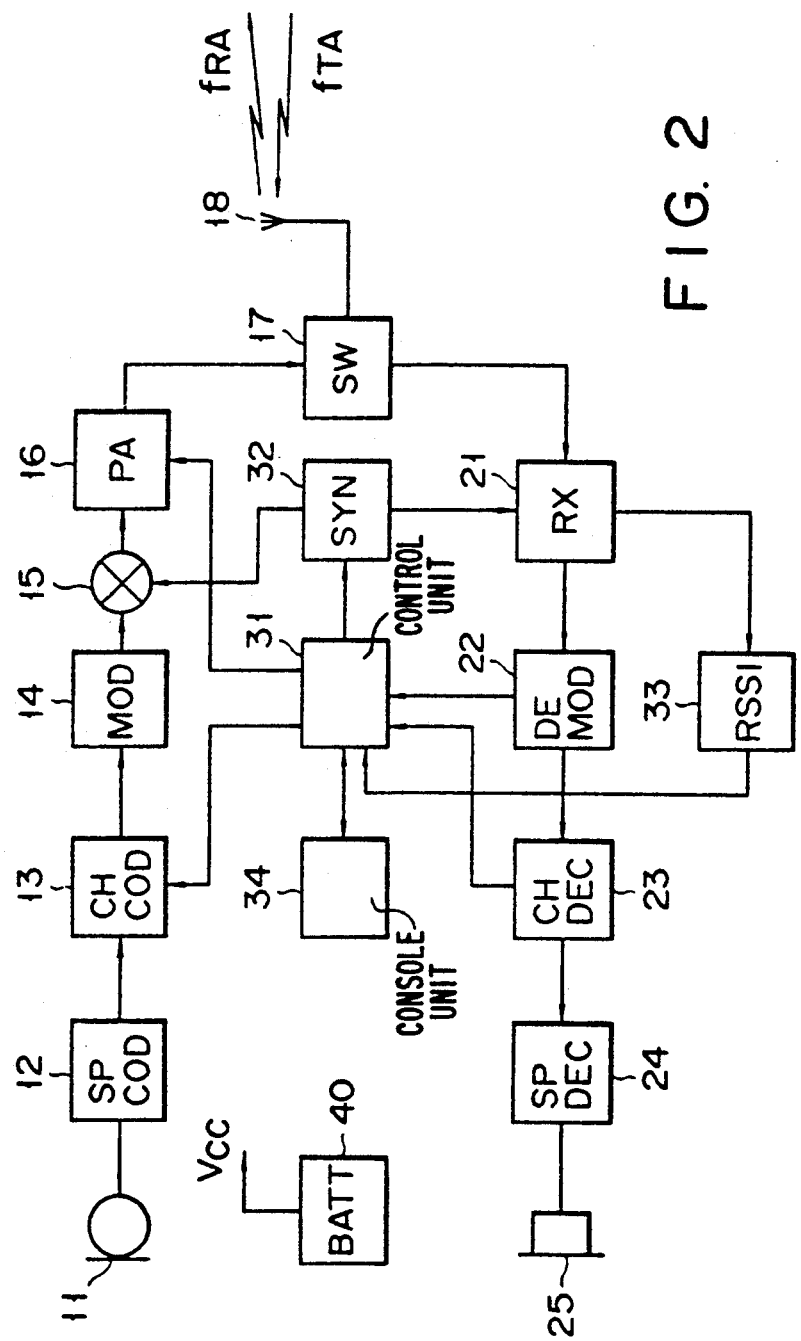
FIG. 2 is a block diagram showing the configuration of a portable device of the embodiment of FIG. 1.

Referring to FIG. 2 showing a block diagram of a portable device PSS to be used for the embodiment, it comprises a transmission system, a reception system and a control system. Reference numeral 40 denotes a power source, which is a battery.

The transmission system comprises a telephone transmitter 11, a speech encoder (SPCOD) 12, an error correction encoder (CHCOD) 13, a digital modulator (MOD) 14, a multiplier 15, a power amplifier (PA) 16, a high frequency switch circuit (SW) 17 and an antenna 18. The speech encoder 12 encodes analog speech signals coming from the telephone transmitter 11 into coded signals. The error correction encoder 13 detects and corrects errors in coded speech signals coming from the speech encoder 12 and encoding control signals coming from a control circuit 31, which will be described later. The digital modulator 14 generates intermediate frequency signals and causes them to be modulated by encoded speech signals coming from the error correction encoder 13 before sending them out. A method called $\pi/4$ shifted differentially encoded quadrature phase shift keying is typically used for modulation in the modulator 14. Then, in the multiplier 15, intermediate frequency signals generated by the digital modulator 14 are mixed with local oscillation signals transmitted from a frequency synthesizer 32 and then subjected to a frequency conversion process to produce radio transmission signals having a frequency that matches the frequency of the assigned radio channel. The power amplifier 16 amplifies the power of radio transmission signals coming from the multiplier 15 to a predetermined transmission power level. The high frequency switch circuit 17 is a switch circuit which is closed only for the period of each transmission time slot assigned by the control circuit 31. Only in this period, radio transmission signals coming from said power amplifier 16 are forwarded to the antenna 18, which sends them out to a corresponding base station BSS.

On the other hand, the reception system comprises a receiver (RX) 21, a digital demodulator (DEM) 22, an error correction decoder (CH-DEC) 23, a speech decoder (SP-DEC) 24 and a telephone receiver or earphone 25. High frequency signals received by the receiver 21 in each predetermined time slot are converted for frequency into intermediate frequency signals in the receiver 21. The digital demodulator 22, after establishing bit-synchronization and frame-synchronization for the incoming intermediate frequency signals from said receiver 21, demodulate them into coded speech signals. The information used for bit- and frame-synchronization in the digital demodulator 22 is fed to the control circuit 31. The error correction decoder 23 decodes demodulated coded signals coming from said digital demodulator for error correction. Coded speech signals from said error correction modulator 23 are fed to the speech demodulator 24, while coding control signals from the error correction modulator 23 are sent to the control circuit 31. The coded speech signals are decoded in the speech decoder 24 to reproduce analog speech signals, which are sent out of the telephone receiver 25 in audible loud voice.

Finally, the control system comprises a control circuit (CONT) 31, a frequency synthesizer (SYN) 32, a received electric field strength sensor circuit (RSSI) 33 and a console unit (CU) 34. The frequency synthesizer generates an oscillation having a local oscillation frequency that matches the radio channel specified by the control circuit 31. The received electric field strength sensor circuit 33 senses the received field strength of the electric wave transmitted from the base station BSS it belongs and sends signals representing the determined field strength to the control circuit 31. The console unit 34 comprises transmission switches, dial keys, a liquid display panel and so on.

The control circuit is normally a microcomputer that comprises a central processing unit (CPU), an input port, an output port, a program ROM and a data RAM. The CPU executes control operations according to the programs stored in the program ROM.

Referring to FIG. 3 showing a block diagram of a mobile base device MSS, it comprises a first transmitter-receiver unit 50 and a second transmitter-receiver unit 80. The first transmitter-receiver unit 50 is used for radio communication with the base station BSS it belongs by way of a first radio channel, whereas the second transmitter-receiver unit 80 is used for radio communication with its portable device PSS by way of a second radio channel.

The first transmitter-receiver unit 50 comprises a transmission system, reception system and a control system. The transmission system is constituted by a register circuit (STR) 51, a speech encoder (SPCOD) 52, an error correction encoder (CHCOD) 53, a digital modulator (MOD) 54, a multiplier 55, a power amplifier (PA) 56, a high frequency switch circuit (SW) 57 and an antenna 58. The register circuit 51 temporarily stores digital speech signals sent from the reception system of the second transmitter-receiver unit 80, which will be described in more detail later. The speech encoder 52 changes the data signaling rate for digital speech signals coming from said register circuit 51. The error correction encoder 53 detects errors in digital speech signals from said speech encoder 52 and digital control signals from a control circuit 71, which will be described later. The digital modulator 54 generates intermediate frequency signals and causes them to be modulated by encoded speech signals coming from the error correction encoder 53 before sending them out. A method called π/4 shifted QPSK is typically used for modulation in the modulator 54. Then, in the multiplier 55, intermediate frequency signals generated by the digital modulator 54 are mixed with local oscillation signals transmitted from a frequency synthesizer 72 and then subjected to a frequency conversion process to produce radio transmission signals having a frequency that matches the frequency of the assigned radio channel. The power amplifier 56 amplifies the power of radio transmission signals coming from the multiplier 55 to a predetermined transmission power level. The high frequency switch circuit 57 is a switch circuit which is closed only for the period of each transmission time slot assigned by the control circuit 71. Only in this period, radio transmission signals coming from said power amplifier 56 are forwarded to the antenna 58, which sends out them to a corresponding base station BOSS.

On the other hand, the reception system comprises a receiver (RX) 61, a digital demodulator (DEM) 62, an error correction decoder (CHDEC) 63, a speech decoder (SPDEC) 64 and a register circuit (STR) 65. In the receiver 61, high frequency signals received by way of the antenna 58 and the high frequency switch circuit 57 in each predetermined time slot are converted for frequency into intermediate frequency signals. The digital demodulator 62, after establishing bit synchronization and frame-synchronization for the incoming intermediate frequency signals from said receiver 61, demodulates them into coded speech signals. The signals used bit- and frame-synchronization are fed to the control circuit 71. The error correction decoder 63 decodes demodulated coded signals coming from said digital dulator for error correction. Coded speech signals from said error correction modulator 63 are fed to the speech demodulator 64, while coding control signals from the error correction modulator 63 are sent to the control circuit 71. The speech decoder 64 changes the data signaling rate for digital speech signals coming from error correction decoder 63 and the digital speech signals whose data signaling rate has been changed are temporarily stored in the register circuit 65 and then sent out to the second transmitter-receiver unit 80.

Finally, the control system comprises a control circuit (CONT) 71, a frequency synthesizer (SYN) 72 and a received electric field strength sensor circuit (RSSI) 73. The control circuit 71 has a main control section which is normally a microcomputer and executes control operations for connecting a base station BSS and a portable device PSS. The frequency synthesizer generates under the control of the control circuit 71 an oscillation having a local oscillation frequency required for radio communication with the base station it belongs. The received electric field strength sensor circuit 33 senses the received field strength of the electric wave transmitted from the base station BSS it belongs and sends signals representing the determined field strength to the control circuit 31.

Like the first transmitter-receiver unit 50, the second transmitter-receiver unit 80 also comprises a transmission system, reception system and a control system. The transmission system is constituted by a speech encoder (SPCOD) 82, an error correction encoder (CHCOD) 83, a digital modulator (MOD) 84, a multiplier 85, a power amplifier (PA) 86, a high frequency switch circuit (SW) 87 and an antenna 88. The transmission power level of the power amplifier 86 is set lower than the transmission power level of the power amplifier 56 of the first transmitter-receiver unit 50. The reception system comprises a receiver (RX) 91, a digital demodulator (DEM) 92, an error correction decoder (CHDEC) 93 and a speech decoder (SPDEC). The control system comprises a frequency synthesizer 102 and a received electric field strength sensor circuit 103. The frequency synthesizer 102 generates under the control of the control circuit 71 an oscillation having a local oscillation frequency required for radio communication with its portable device PSS. The received electric field strength sensor circuit 103 senses the received field strength of the electric wave transmitted from the portable device PSS and sends signals representing the determined field strength to the control circuit 71.

Figure 4:
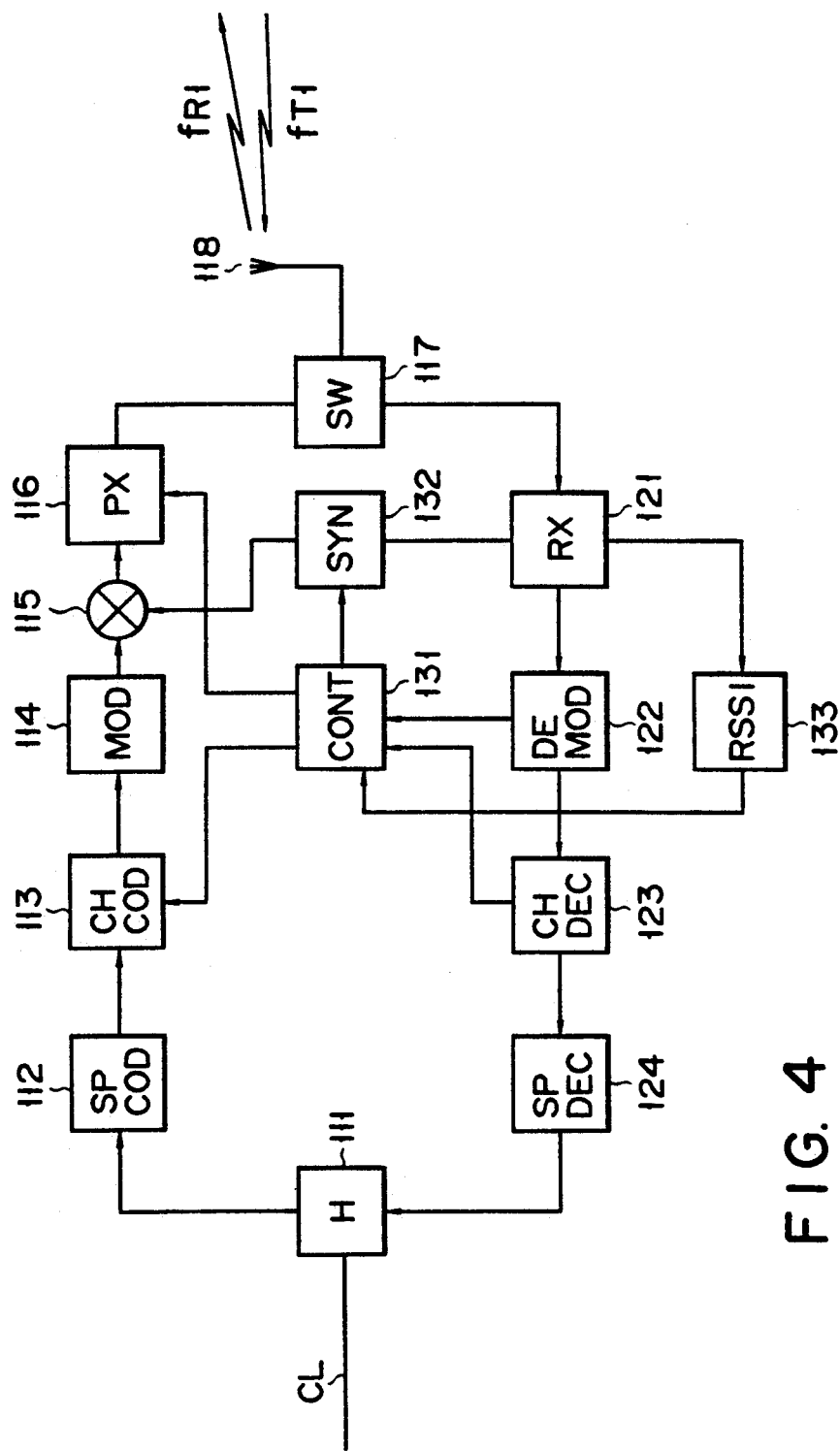
FIG. 4 is a block diagram showing the configuration of a base station of the embodiment of FIG. 1.

Finally, referring to FIG. 4 showing a block diagram of a base station BSS. Base station BSS comprises, like a portable device PSS described above, a transmission system, a reception system, a control system and additionally a hybrid circuit 111, which is used for connecting the transmission system and the reception system to a cable line CL.

The transmission system is constituted by a speech encoder (SPCOD) 112, an error correction encoder (CHCOD) 113, a digital modulator (MOD) 114, a multiplier 115, a power amplifier (PA) 116, a high frequency switch circuit (SW) 117 and an antenna 118. The speech encoder 112 encodes speech signals coming from the wire telephone network NW by way of a cable line CL. The error correction encoder 113 detects and corrects errors in digital speech signals from said speech encoder 112 and digital control signals from a control circuit 131, which will be described later. The digital modulator 114 generates intermediate frequency signals and causes them to be modulated by encoded speech signals coming from the error correction encoder 53 before sending them out. A method called $\pi/4$ shifted QPSK is typically used for modulation in the modulator 114. Then, in the multiplier 115, signals modulated in said modulator 114 are mixed with local oscillation signals transmitted from a frequency synthesizer 132 and then subjected to a frequency conversion process to produce radio transmission signals having a frequency that matches the frequency of the assigned radio channel. The power amplifier 116 amplifies the power of radio transmission signals coming from the multiplier 115 to a predetermined transmission power level. The high frequency switch circuit 117 is a switch circuit which is closed only for the period of each transmission time slot assigned by the control circuit 131. Only in this period, radio transmission signals coming from said power amplifier 116 are forwarded to the antenna 118, which sends out them to a target mobile base device out of the mobile base device MSS1 through MSSm for which it is responsible.

On the other hand, the reception system comprises a receiver (RX) 121, a digital demodulator (DEM) 122, an error correction decoder (CHDEC) 123, a speech decoder (SPDEC) 124. In the receiver 121, high frequency radio signals received by way of the antenna 118 and the high frequency switch circuit 117 in each predetermined time slot are converted for frequency into intermediate frequency signals. The digital demodulator 122, after establishing bit-synchronization and frame-synchronization for the incoming intermediate frequency signals from said receiver 121, demodulate them into coded speech signals. The signals used bit- and frame-synchronization are fed to the control circuit 131. The error correction decoder 123 decodes demodulated coded signals coming from said digital demodulator 122 for error correction. Coded speech signals from said error correction modulator 123 are fed to the speech decoder 124, while coding control signals from the error correction modulator 123 are sent to the control circuit 131. The speech decoder 124 decodes digital speech signals coming from said error correction decoder 123 and decoded analog signals from said speech decoder 124 are sent out to a cable line CL by way of the hybrid circuit 111.

Finally, the control system comprises a control circuit (CONT) 131, a frequency synthesizer (SYS) 132 and a received electric field strength sensor circuit (RSSI) 133. The control circuit 131 has a main control section which is normally a microcomputer and executes control operations for connecting the base station BSS with a first radio channel. The frequency synthesizer 132 generates under the control of the control circuit 131 an oscillation having a local oscillation frequency that matches the radio channel specified by the control circuit 131. The received electric field strength sensor circuit 133 senses the received field strength of the electric wave transmitted from the mobile base device MSS and sends signals representing the determined field strength to the control circuit 131.

The embodiment having a configuration as described above operates in the following manner.

Assume now that a person at mobile station MS2 located in radio zone E2 covered by base station BSS2 has turned on the call request switch on the console unit 34 of the portable device PSS that belongs to the mobile station MS2. Then, the portable device PSS generates a call signal containing the ID code of the station and sends the signal to the mobile base device MSS of the mobile station MS2 by way of a control channel.

Upon receiving the call signal from the portable device PSS, the mobile base device MSS searches for an idle radio channel to be used for communication between itself and the base station BSS. The search operation proceeds in the following way. First, frequency fR1 is selected out of a plurality of radio frequencies fRk (k=1, 2, ...) and set in a reception mode to see if there is any idle one in its time slots TS1 through TS6. If it is found that all the time slots TS1 through TS6 of the radio frequency fR1 are busy, then the next radio frequency, or frequency fR2, is set in a reception mode to see if any of its time slots TS1 through TS6 is currently idle. If the answer is no, then frequency fR3 is checked for an idle time slot. The searching operation goes on until an idle time slot is found in any of the radio frequencies the mobile base device MSS has for signal reception.

Assume that it is found that radio frequency fR1 has an idle time slot as a result of the search operation. Then, the mobile base device MSS detects a synchronous word out of the signals being received through time slot TS1 which is currently busy in the radio frequency fR1 and determines the position of the idle time slot, say time slot TS2, referring to the position of the synchronous word. The data for the position of the idle time slot TS2 as well as the data for the radio frequency fR1 are stored in the RAM of the control circuit 71. The control circuit 72 controls the frequency synthesizer 72 to establish a control channel C-CH and generates an originating signal that contains data for the position of the idle time slot and those for the radio frequency to be used for reception as well as the ID code of the mobile base device MSS, which originating signal is then sent to the base station BSS by way of the control channel C-CH. A preallocated control radio frequency is used for the control channel.

The base station BSS2, or any base station in general which is in a standby state, constantly monitors incoming call signals from the wired telephone network NW and call signals originating from any of the mobile stations MS1 through MSm it covers. If, now, it detects a call signal originating from the mobile base device of mobile station MS2 under this condition, the base station BSS2 generates an answer signal containing the ID code of the calling mobile base device MS and sends it to the mobile base device MSS by way of the control channel C-CH.

The mobile base device MSS at the other end of the control channel C-CH waits for the answer signal from the base station BSS2, observing a predetermined period of time from the transmission of the call signal. If it receives the answer signal within the predetermined period of time from the transmission of the call signal, it controls the transmission and reception systems on the basis of the stored radio frequency fR1 in such a way that signals are sent out only during the allocated transmission time period of time slots TS2 of the assigned radio frequency fT1 and it receives signals only during the allocated time period of time slots TS2 of the assigned radio frequency fR1.

If, on the other hand, the mobile base device MSS does not receive an answer signal within a predetermined period of time after the transmission of the call signal, it judges that the tried radio frequency and time slot are busy and are not currently available to establish a telephone channel. It then goes on the operation of searching an idle time radio frequency and an idle time slot.

Figure 5:
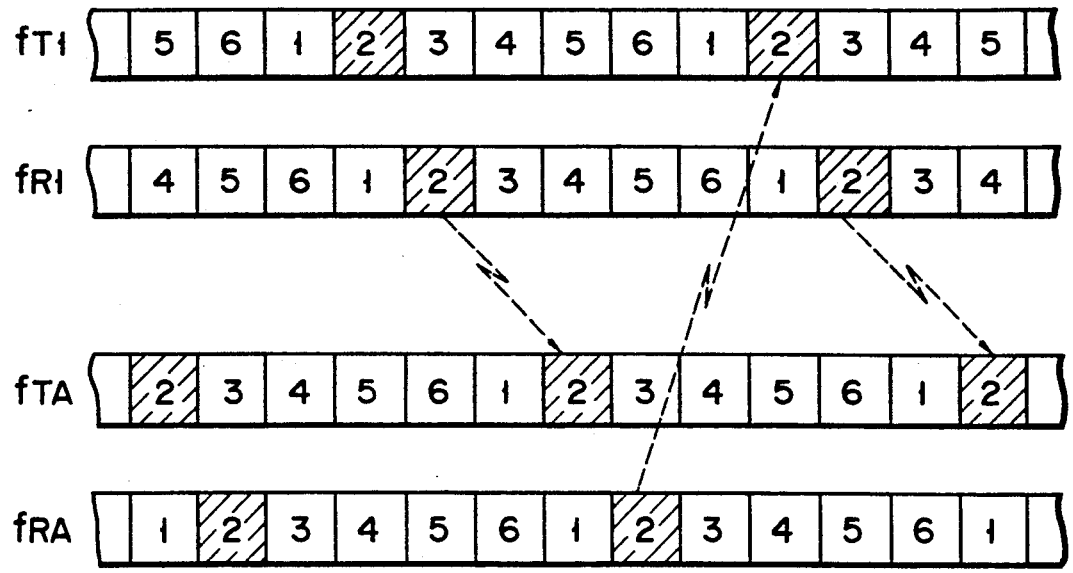
FIG. 5 is a timing chart to be used for selecting first and second radio channels in the embodiment of FIG. 1.

After transmitting the answer signal, the base station BSS2 controls its reception and transmission systems in such a manner that it operates for signal reception during the reception time period of time slots TS2 of the assigned radio frequency fT1 and for signal transmission during the transmission time period of time slots TS2 of the assigned radio frequency fR1 as shown in FIG. 5.

Now, the base station BSS2 and the mobile base device MSS of the mobile station MS2 are mutually connected by way of a first radio channel having radio frequencies fT1 and fR1 and time slot TS2 available for telephone communication between the two stations.

Once a first radio channel is established between the two stations, the mobile base device MSS operates to search an idle second radio channel that matches the established first radio channel. First, it sequentially tries radio frequencies allotted to it for telephone communication between the mobile base device MSS and the portable device PSS, say three radio frequencies fRA, fRB and fRC, to find out a radio frequency having an idle time slot available for signal reception. If, for instance, it is found that radio frequency fRA has an idle time slot available for reception, it picks up an idle time slot which is in the matching radio frequency fTA to be used for signal transmission and located behind the time slot in the reception radio channel by a predetermined length of time. The predetermined length of time is the time required for the mobile base device MSS to transmit a digital signal to the portable device PSS by its second transmitter-receiver unit 80 after receiving the signal from the base station BSS2 by its first transmitter-receiver unit 50 and can be equal to the length of two time slots. Thus, the selection of time slots for the signal transmission radio frequency fTA will be as shown in FIG. 5.

After selecting the time slot TS2 for signal transmission, the mobile base device MSS generates an answer signal that contains data for specifying the time slot TS2 and the radio frequency fTA for signal transmission and the ID code of the portable device PSS and send it to the portable device PSS by way of the control channel. After sending the answer signal, it controls its reception and transmission systems in such a manner that it operates for signal transmission during the transmission time period of time slots TS2 that follows and signal reception during the reception time period of time slots that follows.

The portable device PSS at the other end of the control channel waits for the answer signal from the mobile base device MSS, observing a predetermined period of time from the transmission of the call signal. If it receives the answer signal within the predetermined period of time from the transmission of the call signal, it controls the transmission and reception systems on the basis of the data for specifying the radio channel contained in the answer signal in such a way that signals are sent out only during the allocated transmission time period of time slots TS2 of the assigned radio frequency fTA and it receives signals only during the allocated time period of time slots TS2 of the assigned radio frequency fRA.

Now, the portable device PSS and the mobile base device MSS are mutually connected by way of a second radio channel having radio frequencies fTA and fRA and time slot TS2 available for telephone communication between the two stations as shown in FIG. 5. Then, the second radio channel and the first radio channel that has been established between the mobile base device MSS and the base station BSS2 are mutually connected within the mobile base device MSS to establish a telephone communication path running all the way from the portable device PSS to the base station BSS2 and using the first and second radio channels. The person at the portable device PSS now can call the terminal at the other end of the line and talk with the person there.

As it may be understood by the above description, since not only a base station BSS and a mobile base device MSS but also a mobile base device MSS and a portable device PSS of the present embodiment can be mutually connected by way of a radio channel, a cable line or a curled cord is not required for connecting the telephone main unit and the handset of a mobile station. Therefore, a speaker in an automobile equipped with such a mobile station is exempt from positional as well as postural limitations that used to exist with a conventional automobile telephone set so that a large degree of freedom of movement is allowed to the speaker in the car, which will be particularly appreciated in a large vehicle such as a chartered bus.

Moreover, because of the use of a FDMA/TDMA technique for radio channels between a base station BSS and a mobile base device MSS and between a mobile base device MSS and a portable device PSS in this embodiment, its capacity is greatly enhanced in terms of the number of stations it accommodates so that it ca readily adapt itself to situations where a large number of candidate subscribers are on the waiting list and effectively exploit the limited resource of radio frequencies available to it.

The present embodiment has a feature of differentiating the timing of the selected transmission time slot of the first radio channel and that of the selected transmission time slot of the second radio channel so that the two radio channels do not operate synchronously to eliminate any possibility of generating undesired spurious conditions for signal transmission and reduce the peak value of energy consumption for the power source. Since the feature of timing differentiation is also provided for reception time slots, the four radio channels involved in a telephone communication between a portable device PSS and a base station BSS are protected against any mutual interferences to secure a high quality of radio telephone communication.

2nd Embodiment

Figure 6:
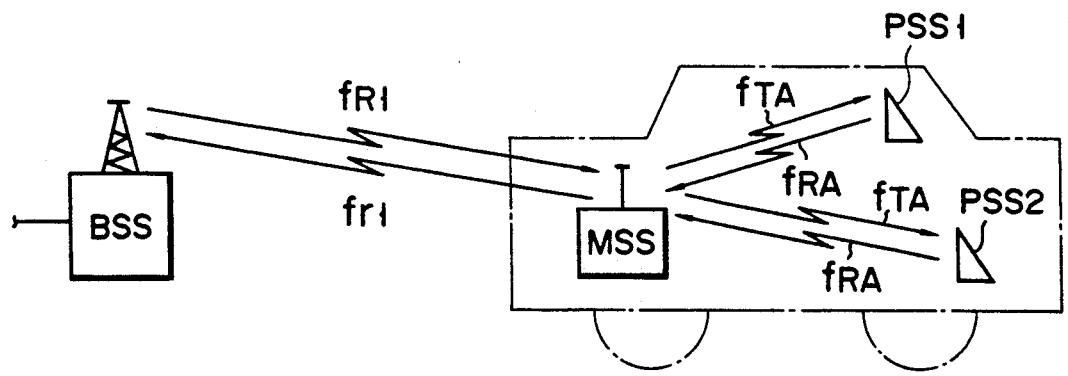
FIG. 6 is a schematic view of a second embodiment of the mobile radio communication system of the invention, illustrating its basic concept.

FIG. 6 illustrates the basic concept of a second embodiment of the invention.

It shows a system where a mobile base device MSS can be connected simultaneously with two portable devices PSS1 and PSS2 so that both portable devices may share a common terminal at the other end of the line.

Assume now that base station BSS2 and mobile base device MSS are connected with each other by way of time slots TS2 of radio frequencies fT1 and fR1 and that said mobile base device MSS and a first portable device PSS1 are connected with each other by way of time slots TR3 and TR4 of radio frequencies fTA and fRA so that the line is currently busy.

If the call request switch of the other portable device PSS2 is turned on under this condition, the portable device PSS2 transmits a call signal to the mobile base device MSS by way of the control channel. The mobile base device MSS constantly monitors incoming call signals except when it receives radio signals from the first portable device PSS1. If the call signal from the second portable device PSS2 arrives under this condition, the mobile base device MSS starts an operation of assigning a radio channel to the portable device PSS2.

First, the mobile base device MSS searches an idle time slot in the reception radio frequency fRA when it does not receive radio signals from the first portable device PSS1. If it finds an idle time slot, it then determines if it is an appropriate time slot or not. An appropriate time slot here means that it is delayed relative to the busy reception time slot TS2 of the first radio channel by at least a predetermined time length and does not come during the busy transmission time slot TS2 of the first radio channel. The predetermined time length here means a time length required for the mobile base device MSS to receive a signal from the base station BSS2 and forward it to the portable device PSS2.

Assume here that the mobile base device MSS finds that time slot TS5 of reception radio frequency fRA is idle and appropriate. Then, the mobile base device MSS generates an answer signal containing data necessary to specify transmission time slot TS4 of transmission radio frequency fTA that corresponds to the transmission time slot TS5 and the I code of the portable device PSS2 and sends the answer signal to the portable device PSS2 by way of the control channel. Once the answer signal is sent out, the transmission time slot TS4 becomes busy as the currently busy transmission time slot TS3. Similarly, the reception time slot TS5 becomes busy just as the currently busy reception time slot TS4 of the reception radio frequency fRA.

The portable device PSS2 at the other end of the control channel waits for the answer signal from the mobile base device MSS, observing a predetermined period of time from the transmission of the call signal. If it receives the answer signal within the predetermined period of time from the transmission of the call signal, it controls the transmission and reception systems on the basis of the data for specifying a channel contained in the answer signal in such a way that it receives signals only during the allocated time period of time slots TS4 of the assigned radio frequency fTA and signals are sent out from it only during the allocated transmission time period of time slots TS5 of the assigned radio frequency fRA.

Figure 7:
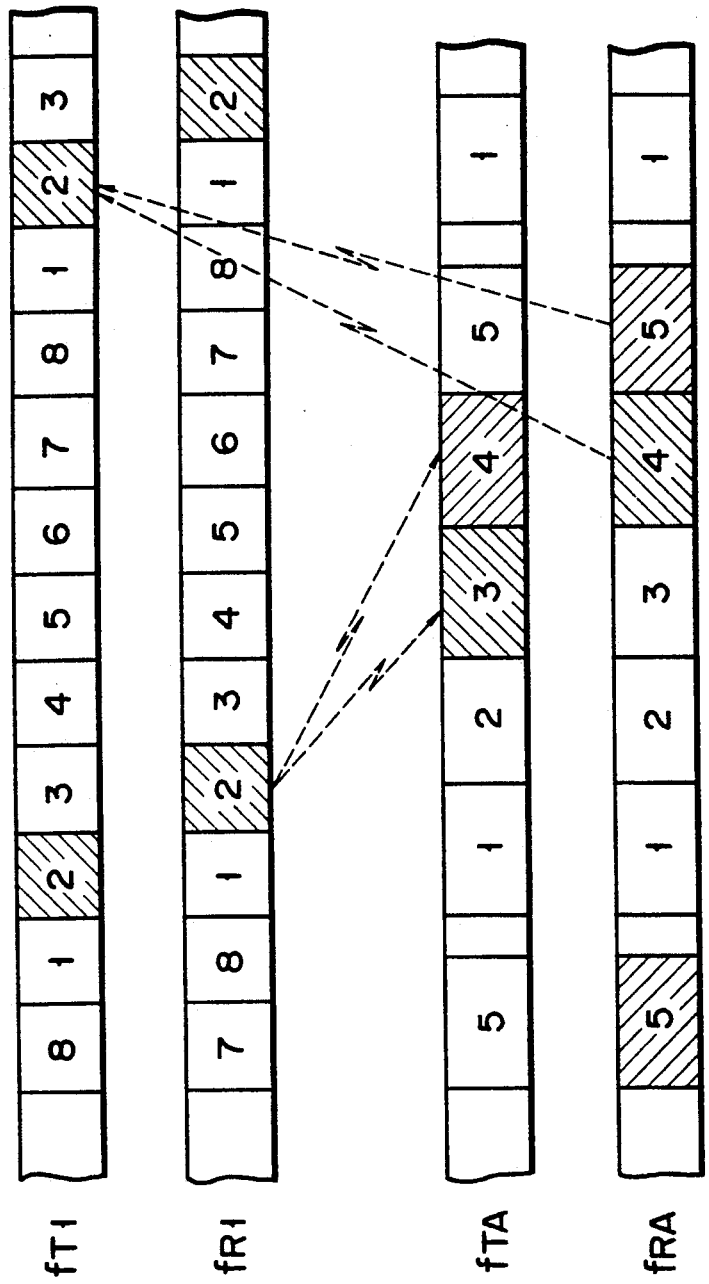
FIG. 7 is a timing chart to be used for selecting first and second radio channels in the embodiment of FIG. 2.

Now, the portable device PSS2 and the mobile base device MSS are mutually connected by way of a radio channel having a transmission time slot TS4 of a radio frequency fTA and a reception time slot TS5 of a radio frequency fRA as shown in FIG. 7. The radio channel is connected with the first radio channel that has been established between the mobile base device MSS and the base station BSS2, to which the radio channel between the first portable device PSS1 and the mobile base device MSS is already connected. Thus, the terminal at the other end of the line can be commonly shared by both the portable device PSS1 and the portable device PSS2 for telephone communication.

In other words, the line connecting the base station BSS2 and the mobile base device MSS can be branched to connect both the portable device PSS1 and the portable device PSS2 with the base station BSS2.

As seen from FIG. 7, the number of time slots to be used in a time frame of a radio frequency for communication between a mobile base device MSS and a portable device PSS is smaller than the number of time slots in a time frame of a radio frequency for communication between a base station BSS and a mobile base device MSS. The reason for this is that the line traffic between the mobile base device MSS and the portable device PSS is lower than the line traffic between the base station BSS and the mobile base device MSS and therefore a large line capacity is not needed for communication between the mobile base device MSS and the portable device PSS. With such an arrangement, the bit rate for digital data transmission can be held low so that a CPU having a relatively slow processing speed may be used for the control circuit 31 of the portable devices PSS1 and PSS2 to reduce the cost of the control circuit.

3rd Embodiment

In this embodiment, part of a first transmitter-receiver unit of a mobile base device for radio communication with a base station is used for a second transmitter-receiver unit of the mobile base device for radio communication with a portable devices.

Figure 8:
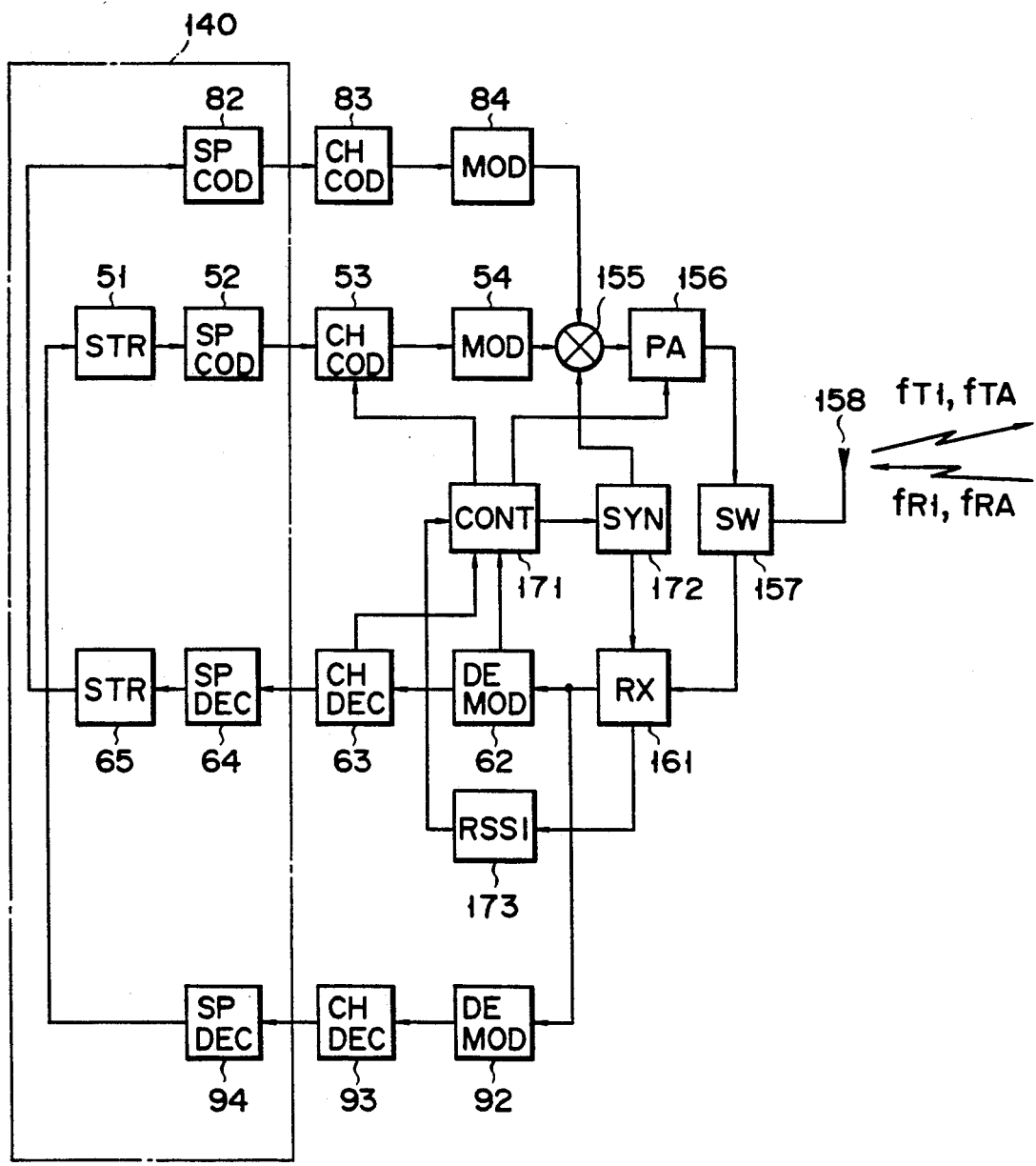
FIG. 8 is a block diagram showing the configuration of a mobile base device in a third embodiment of the invention.

FIG. 8 shows a block diagram of a mobile base device of this embodiment. The components which are identical with the corresponding components of the first embodiment shown in FIG. 3 are indicated by same reference numerals.

The mobile base device of this embodiment has only a control circuit 171, a frequency synthesizer 172, a reception electric field strength sensor circuit 173, a transmission-reception multiplier 155, a power amplifier 156, a high frequency switch 157, an antenna 158 and a receiver 161, which are shared by both the first and second transmitter-receiver units. The control circuit 171 controls the allocation of transmission and reception time slots for radio communication with the base station and that of transmission and reception time slots for radio communication with the portable device PSS so that the former and latter time slots do not come simultaneously.

Speech encoders 52 and 82, speech decoders 64 and 94 and register circuits 51 and 65 of the first and second transmitter-receiver units are formed as a single integral audio card, which is used as a digital signal processor (DSP) 140.

Assume now that a radio signal is sent out from the base station by way of a reception time slot of a first radio channel. Then, the radio signal is received by the receiver 161 by way of the antenna 158 and the audio switch 157 during the reception time slot and then decoded by digital decoder 62. The decoded digital signal is then corrected for errors by error correction decoder 63, converted for speed by the audio decoder 64 and temporarily stored in the register circuit 65. The digital speech signal stored in the register circuit 65 is read out during transmission time slots allocated for the portable device. The read out digital speech signal is then converted for speed by the speech encoder 82, corrected for errors by error correction encoder 83 and then converted into a modulated signal by digital modulator 84. The modulated signal is mixed with a local oscillation signal generated by the frequency synthesizer in the multiplier 155 to become a radio transmission signal. The power level of the radio transmission signal is amplified by the power amplifier 156 and then transmitted to the portable device by way of the high frequency switch 157 and the antenna 158. The power level of the signal coming out from the power amplifier 156 is set to a relatively low value because of the short distance between the mobile base device and the portable device.

On the other hand, a radio signal transmitted by the portable device by way of a reception time slot of a second radio channel is received by the receiver 161 by way of the antenna 158 and the high frequency switch 157 in said reception time slot and then demodulated by digital demodulator 92. The demodulated digital speech signal is corrected for errors by error correction decoder 93, read out during the transmission time slot for signal transmission to the base station and converted for speed by the speech decoder 52 before it is corrected for errors by error correction encoder 53 and converted into modulated signal by the digital modulated 54. The modulated signal is then mixed with a local oscillation signal generated by the frequency synthesizer in the multiplier 155 to become a radio transmission signal. The power level of the radio transmission signal is amplified by the power amplifier 156 and then sent out to the base station by way of the high frequency switch 157 and the antenna 158. The power level of the signal coming out from the power amplifier 156 is set to a relatively high value because of the long distance that normally exists between the mobile base device and the base station.

In this embodiment, since part of the first transmitter-receiver unit for radio communication between a mobile base device and a base station is used also by the send transmitter-receiver unit for radio communication between the mobile base device and a portable device and the speech encoders speech decoders and register circuits of the two units are respectively formed as single integral audio codes, the overall configuration of the mobile base device is very simplified so that it may be made very compact and light weight.

4th Embodiment

In this embodiment, a mobile base device is connected with a handset by way of a cord such as a curled cord to allow telephone communication to take place by way of the handset. FIG. 9 shows a block diagram of the embodiment. In FIG. 9, handset 200 comprises as integral components thereof a telephone transmitter 201, a telephone receiver 202 and a console unit (CU) 203. The console unit 203 is provided with dial keys, signal transmission switches and an LCD unit. On the other hand, switch circuits 66, 67 are arranged respectively on the input signal path of register circuit 51 and the output signal path of register circuit 65 of a first transmitter-receiver unit 50'. These switch circuits 66, 67 operate under the control of control circuit 71'.

Assume, for instance, that a request for calling a wired telephone terminal of a wire telephone network NW is made by means of the console unit 203 of the handset 200. Then, the switch circuits 66, 67 respectively connect the telephone speaker 201 and the telephone receiver 202 of the handset 200 with the respective register circuits 51, 65 under the control of the control circuit 71'. The control circuit 71' then searches an idle first radio channel and operates to establish a communication path between the wired telephone terminals and the handset which plays the role of a subscribers telephone set.

On the other hand, when a request for calling a portable device is made by means of the console unit 203 of the handset 200, the switch circuits 66, 67 respectively connect the telephone speaker 201 and the telephone receiver 202 of the handset 200 with speech decoder 94 and speech encoder 82. Under this condition, the control circuit 71' searches an idle second radio channel and operates to establish a communication path between the handset 200 and the portable device, which plays the role of an extension terminal.

When a portable device is connected with a wired telephone terminal by way of a communication path including first and second radio channels, the switch circuits 66, 67 respectively connect the register circuits 51, 65 with the speech decoder 94 and the speech encoder 82. If a request for branching the line is made by using the console unit 203 of the handset 200 under this condition, the switch circuits 66, 67 respectively connect the telephone transmitter 201 and the telephone receiver 202 to the respective communication paths that have been established between the register circuits 51, 65 and the speech decoder 94 and the speech encoder 82 respectively, without disconnecting the communication paths under the control of the control circuit 71'. Consequently, the handset 200 can be used as a branched terminal.

If, a request for a three party communication is made at the console unit 203 of the handset 20 while two portable devices are being connected, the switch circuits 66, 67 connect the telephone transmitter 201 and the telephone receiver 202 of the handset 200 to the communication path between the two portable devices to allow a three party communication.

The scope of the present invention is not limited by the above described embodiments. For instance, while a FDMA/TDMA technique is employed for radio channels connecting base stations and mobile base devices as well as mobile base devices and portable devices, a FDMA or TDMA technique may be used in its place. Moreover, a FDMA/TDMA technique may be used for connection between base stations and mobile base devices, while a FDMA or TDMA technique us used for connecting mobile base devices and portable devices. Besides, the frequencies of the first radio channel and those of the second radio channel involved in a communication path may have a relationship of fT1=fR1 and fTA=fTB, which is called a TDD technique or a ping-pong technique.

While a mobile base device MSS searches an idle time slot before it transmits signals to a base station BSS in any of the above described embodiments, the present invention is not limited to such a mode of operation. In a system according to the invention where a number of base stations BSSs can use radio frequencies assigned to each of them, each of the base stations BSSs may search idle time slots since it can completely control and fully exploit all idle time slots of the radio frequencies assigned to it.

While a same method of coding and modulation is used in both the first and second transmitter-receiver units of a mobile base device in any of the above described embodiments, a more simple method of coding and modulation may be used for communication between a mobile base device and a portable device than for communication between a base station and a mobile base device because the communication path between the mobile base device and the portable device is normally shorter than the path between the base station and the mobile base device and therefore the rate of errors in signals due to high speed fading phenomena is smaller in the former path.

While each of the above described embodiments is an automobile telephone system, a system according to the invention may be applied to a cordless telephone system that normally comprises stationary units connected to subscribers' lines of a wire telephone network and cordless telephone sets connected to the respective stationary units by way of radio channels, where the stationary units corresponds to the mobile base devices and the cordless telephone sets correspond to the portable devices of the above embodiments. Base stations are also provided and connected to a wire telephone network. Each of the stationary units is connected to one of the base stations by way of a first radio channel, whereas each of the stationary units is connected to its codeless radio telephone set by way of a second radio channel. With such an arrangement, additional subscribers' cable lines are not required for candidates on the waiting list and a less costly telephone network can be installed.

A system according to the invention may comprise automobile telephone main units that operate as mobile base devices and portable radio telephone sets that operate as portable devices, each of the telephone main units being connected with a corresponding portable radio telephone set by way of a second radio channel. Alternatively, cordless telephone sets may be used for portable devices.

Finally, the above described embodiments may be modified in terms of the number of time slots and the bit rate in a time frame and the circuit configuration of the base station, the mobile base device and the portable device without departing from the scope of the present invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A mobile radio communication system comprising:
   a base station connected to a communication network by a wired communication path;
   a mobile base device connectable to said base station over one of a first plurality of time-division multiple access radio channels, each one of the first plurality of time-division multiple access radio channels defined by a radio frequency and a time slot;
   at least one portable device connectable to said mobile base device over one of a second plurality of time-division multiple access radio channels, each one of the second plurality of time-division multiple access radio channels defined by a radio frequency and a time slot,
   wherein said mobile base device includes:
      a first connection control means for searching the first plurality of time-division multiple access radio channels for an idle radio channel and establishing a radio connection between said base station and said mobile base device over a first radio channel found during the search of the first plurality of time-division multiple access radio channels;
      a second connection control means for searching the second plurality of time-division multiple access radio channels for an idle radio channel having time slots in a predetermined relationship with time slots of the first radio channel and establishing a radio connection between said portable device and said mobile base device over a second radio channel found during the search of the second plurality of time-division multiple access radio channels; and
      a third connection control means for connecting the first radio channel and the second radio channel in order to establish a radio communication path between said base station and said portable device.

2. A mobile radio communication system according to claim 1, wherein said second connection control means searches the second plurality of time-division multiple access radio channels for a plurality of idle radio channels each having time slots with a different predetermined relationship to the time slots of the first radio channel in response to requests for simultaneously establishing connections between a plurality of portable devices and said mobile base device and establishes respective connections between said plurality of portable devices and said mobile base device over ones of the second plurality of time-division multiple access radio channels found during the search of the second plurality of time-division multiple access radio channels, and said third connection control means connects the ones of the second plurality of time-division multiple access radio channels and the first radio channel in order to establish a radio communication path between said base station and each of the plurality of portable devices requesting connections.

3. A mobile radio communication system according to claim 1, wherein said second connection control means searches said second plurality of time-division multiple access radio channels for a plurality of idle radio channels in response to requests for establishing a connection between at least two portable devices and establishes a connection between said at least two portable devices over ones of the second plurality of time-division multiple access radio channels found during the search of the second plurality of time-division multiple access radio channels.

4. A mobile radio communication system according to claim 1, wherein a time slot length of said second radio channels is longer than a time slot length of said first radio channels.

5. A method of connecting radio channels in a mobile radio communication system comprising a base station connected to a communication network by a wired communication path, a mobile base device connectable to said base station over one of a first plurality of time-division multiple access radio channels, each one of the first plurality of time-division multiple access radio channels defined by a radio frequency and a time slot, and at least one portable device connectable to said mobile base device over one of a second plurality of time-division multiple access radio channels, each one of the second plurality of time-division multiple access radio channels defined by a radio frequency and a time slot, the method comprising the steps of:
   searching the first plurality of time-division multiple access radio channels for an idle radio channel and establishing a radio connection between said base station and said mobile base device over a first radio channel found during the search of the first plurality of time-division multiple access radio channels;
   searching the second plurality of time-division multiple access radio channels for an idle radio channel having time slots in a predetermined relationship with time slots of the first radio channel and establishing a radio connection between said portable device and said mobile base device over a second radio channel found during the search of the second plurality of time-division multiple access radio channels; and connecting the first radio channel and the second radio channel in order to establish a radio communication path between said base station and said portable device.

6. A mobile base device for use in a radio communication system including a base station connected to a communication network by a wired communication path, said mobile base device comprising:

a first communication means for communicating with said base station over one of a first plurality of time-division multiple access radio channels, each one of the first plurality of time-division multiple access radio channels defined by a radio frequency and a time slot;

a second communication means for communicating with at least one portable device over one of a second plurality of time-division multiple access radio channels, each one of the second plurality of time-division multiple access radio channels defined by a radio frequency and a time slot;

a first connection control means for searching the first plurality of time-division multiple access radio channels for an idle radio channel and establishing a radio connection between said base station and said first communication means over a first radio channel found during the search of the first plurality of time-division multiple access radio channels;

a second connection control means for searching the second plurality of time-division multiple access radio channels for an idle radio channel having time slots in a predetermined relationship with the time slots of the first radio channel and establishing a radio connection between said portable device and said second communication means over a second radio channel found during the search of the second plurality of time-division multiple access radio channels; and a third connection control means for connecting the signal path of said first communication means and the signal path of said second communication means in order to establish a radio communication path between said base station and said portable device.

7. A mobile base device according to claim 6, wherein said second connection control means searches for an idle radio channel having an idle transmission time slot temporarily shifted with a transmission time slot of the first radio channel.

8. A mobile base device according to claim 6, wherein at least a portion of said second communication means is shared by said first communication means.

9. A mobile base device according to claim 6, wherein a transmission power level of the second radio channel is lower than a transmission power level of the first radio channel.

10. A mobile base device according to claim 8, wherein means are provided for variably controlling the transmission power level of the shared communication means for the first radio channel and the second radio channel.

11. A mobile radio communication system comprising:

a base station connected to a communication network by a wired communication path;

a mobile device connectable to said base station over one of a first plurality of time-division multiple access radio channels, each one of the first plurality of time-division multiple access radio channels defined by a radio frequency and a time slot;

at least one portable device connectable to said mobile base device over one of a second plurality of time-division multiple access radio channels, each one of the second plurality of time-division multiple access radio channels defined by a radio frequency and a time slot; and a fixed communication device connected to said mobile base device by wired lines, wherein said mobile base device includes:

a first connection control means for searching the first plurality of time-division multiple access radio channels for an idle radio channel and establishing a radio connection between said base station and said mobile base device over a first radio channel found during the search of the first plurality of time-division multiple access radio channels;

a second connection control means for searching the second plurality of time-division multiple access radio channels for an idle radio channel having time slots in a predetermined relationship with time slots of the first radio channel and establishing a connection between said portable device and said mobile base device over a second radio channel found during the search of the second plurality of time-division multiple access radio channels; and a third connection control means for selectively connecting at least two of the first radio channel, the second radio channel, and said fixed communication device to each other.

12. A mobile radio communication system according to claim 11, wherein said mobile base device searches the first plurality of time-division multiple access radio channels for an idle radio channel in response to a request by said fixed communication device for establishing a connection between said fixed communication device and said base station and establishes a connection between the first radio channel and said wired lines of said fixed communication device.

13. A mobile radio communication system according to claim 11, wherein said mobile base device searches the second plurality of time-division multiple access radio channels for an idle radio channel in response to a request by said portable device or the fixed communication device for establishing a connection between said portable device and said fixed communication device and establishes a connection between the second radio channel and said wired lines of said fixed communication device.

14. A mobile radio communication system according to claim 11, wherein said mobile base device establishes a connection between the communication path connecting the first and second radio channels and said wired lines of said fixed communication device in response to a request by said fixed communication device for establishing a branched connection while said base station and said portable device are connected by the first and second radio channels.

15. A mobile radio communication system comprising:

a base station connected to a communication network by a wire communication path;

a mobile base device connectable to said base station over one of a first plurality of time-division multiple access radio channels; and a portable device connectable to said mobile base device over one of a second plurality of time-division multiple access radio channels, wherein said mobile base device includes:

means for searching the first plurality of time-division multiple access radio channels for an idle radio channel having predetermined characteristics;

means for searching the second plurality of time-division multiple access radio channels for an idle radio channel having characteristics with a predetermined relationship to the characteristics of a radio channel found during the search of the first plurality of time-division multiple access radio channels; and means for connecting the respective radio channels found during the searches of the first and second pluralities of time-division multiple access radio channels to establish a radio communication path between said base station and said portable device.

16. A method of connecting radio channels in a mobile radio communication system comprising a base station connected to a communication network by a wired communication path, a mobile base device connectable to said base station over one of a first plurality of time-division multiple access radio channels, and a portable device connectable to said mobile base device over one of a second plurality of time-division multiple access radio channels, the method comprising the steps of:

searching the first plurality of time-division multiple access radio channels for an idle radio channel having predetermined characteristics;

searching the second plurality of time-division multiple access radio channels for an idle radio channel having characteristics with a predetermined relationship with to the characteristics of the radio channel found during the search of the first plurality of time-division multiple access radio channels; and connecting the respective radio channels found during the searches of the first and second pluralities of time-division multiple access radio channels to establish a radio communication path between said base station and said portable device.

17. A mobile communication apparatus having a first radio unit and a second radio unit for use in a radio communication system wherein a geographical area is served by a plurality of base stations, each of said base stations covering a zone of the geographical area, said mobile communication apparatus comprising:

first connection control means for selecting one of a plurality of time-division multiple access radio channels each characterized by a frequency and a time slot and for establishing a first radio link between one of said base stations and said first radio unit over the selected one of the first plurality of time-division multiple access radio channels; and second connection control means for selecting one of a second plurality of time-division multiple access radio channels each characterized by a frequency and a time slot and for establishing a second radio link between said first radio unit and said second radio unit over the selected one of the second plurality of time-division multiple access radio channels, the selected one of the second plurality of time-division multiple access radio channels having characteristics determined by the characteristics of the selected one of the first plurality of time-division multiple access radio channels, whereby a communication link between said one base station and said second radio unit is established, and wherein time slots for the second radio link are determined on the basis of the time slots utilized for the first radio link.

18. The apparatus according to claim 17, further comprising third establishing means for establishing a third radio link for transmitting a call request between said first radio unit and said second radio unit before the first radio link is established in the event that a call operation resulting in the call request is made by a user of said second radio unit and wherein the first establishing means establishes the first radio link in response to the call request.

19. The apparatus according to claim 17, wherein the first radio channel is the same frequency as the second radio channel.

20. A method of establishing a communication link between a first radio unit and a base station in a radio communication system wherein a geographical area is served by a plurality of base stations, each of said base stations covering a zone, the method comprising the steps of:

providing a second radio unit including a transmitter having a transmission power level which is greater than a transmission power level of said first radio unit;

establishing a first radio link between said base station and said second radio unit over a first radio channel selected from a first plurality of time-division multiple access channels each characterized by a frequency and a time slot; and establishing a second radio link between said second radio unit and said first radio unit over a second radio channel selected from a second plurality of time-division multiple access channels each characterized by a frequency and a time slot, the second radio channel having characteristics determined by the characteristics of the first radio channel, whereby a communication link between said base station and said first radio unit is established, wherein the time slots for the second radio link are determined on the basis of the time slots utilized for the first radio link.

21. The method according to claim 20, further comprising, prior to the step of establishing the first radio link, a step of establishing a third radio link between said second radio unit and said first radio unit over a third radio channel in response to a call origination operation initiated by a user of said first radio unit and wherein the establishment of the first radio link is initiated in response to a call request signal transmitted over the third radio link.

22. The method according to claim 20, wherein the first radio channel is the same frequency as the second radio channel.

23. A method of establishing a communication link between a first radio unit and a base station in a radio communication system wherein a geographical area is served by a plurality of base stations, each of said base stations covering a zone of the geographic area, the method comprising the steps of:

providing a second radio unit including a transmitter having a transmission power level which is greater than a transmission power level of said first radio unit;

establishing a first radio link between said base station and said second radio unit over a first radio channel by selecting one of a first plurality of time-division multiple access (TDMA) radio channels each characterized by a frequency and a time slot; and establishing a second radio link between said second radio unit and said first radio unit over the first radio channel by selecting one of a second plurality of time-division multiple access (TDMA) radio channels each characterized by a frequency and a time slot, wherein time slots for the second radio link are assigned on the basis of the time slots assigned for the first radio link, whereby a communication link between said base station and said first radio unit is established.

24. The method according to claim 23, further comprising, prior to the step of establishing the first radio link, a step of establishing a third radio link between said second radio unit and said first radio unit over a third radio channel in response to a call origination operation initiated by a user of said first radio unit and wherein the establishment of the first radio link is initiated in response to a call request signal transmitted over the third radio link.

25. A mobile base apparatus used in radio communication system having a plurality of base stations which have radio communication zones, respectively, said mobile base apparatus and a mobile terminal apparatus, which are used in said radio communication zones, said mobile base apparatus comprising:

first establishing means for searching a first plurality of time-division multiple access radio channels, which are respectively defined by radio frequencies and time slots, to select a first time-division multiple access channel which is idle, and establishing a first radio link between one of said base stations and said mobile base apparatus over said selected first time-division multiple access radio channel;

second establishing means for searching a second plurality of time-division multiple access radio channels, which are respectively defined by radio frequencies and time slots, to select a second time-division multiple access radio channel which is idle, and establishing a second radio link between said mobile base apparatus and said mobile terminal apparatus over said selected second time-division multiple access radio channel a time slot which define said selected first time-division multiple access radio channel differing from a frequency and a time slot which define said selected first time-division multiple access radio channel, said time slot of said selected second time-division multiple access radio channel being selected in accordance with the position of said time slots of said selected first time-division multiple access radio channel;

first communication means for transmitting and receiving a communication signal to and from one of said base stations through said first radio link; and second communication means for transmitting and receiving a communication signal to and from said mobile terminal apparatus through said second radio link.

26. The mobile base apparatus according to claim 25, further comprising control means for controlling a transmitting power level of said second communication means so that said transmitting power level is lower than a transmitting power level of said first communication means.

27. The mobile base apparatus according to claim 25, wherein said first communication means includes a transceiver which is used in common by said second communication means.

28. A mobile base apparatus used in a radio communication system having a plurality of base stations which have radio communication zones, respectively, a mobile base apparatus and a mobile terminal apparatus, which are used in said radio communication zones, said mobile base apparatus comprising:

first establishing means for searching a first plurality of time-division multiple access radio channels, which are respectively defined by radio frequencies and time slots, to select a first time-division multiple access radio channel which is idle, and establishing a first radio link between one of said stations and said mobile base apparatus over said selected first time-division multiple access radio channel;

second establishing means for searching a second plurality of time-division multiple access radio channels, which are respectively defined by radio frequencies and time slots, to select a second time-division multiple access radio channel being idle and having a predetermined relationship with said first time-division multiple access radio channel, and establishing a second radio link between said mobile base apparatus and said mobile terminal apparatus over said selected second time-division multiple access radio channel;

connection means for connecting said first radio link to said second radio link, and establishing a communication link between said one of said base stations and said mobile terminal apparatus;

first communication means for sending and receiving a communication signal to and from said one of said base stations through said first radio link;

second communication means for sending or receiving a communication signal to or from said mobile terminal apparatus through said second radio link; and control means for controlling a transmitting power level of said second communication means so that said transmitting power level is lower than a transmitting power level of said first communication means.

29. A mobile base apparatus used in a radio communication system having a plurality of base stations which have radio communication zones, respectively, said mobile base apparatus and a mobile terminal apparatus, which are used in said radio communication zones, said mobile base apparatus comprising:

first establishing means for searching a first plurality of radio channels which are respectively defined by radio frequencies and time slots, to select a first radio channel which is idle, and establishing a first radio link between one of said base stations and said mobile base apparatus over said selected first radio channel;

second establishing means for searching a second plurality of radio channels, which are respectively defined by radio channels, which are respectively defined by radio frequencies and time slots, to select a second radio channel being idle and having a predetermined relationship with said selected first radio channel, and establishing a second radio link between said mobile base apparatus and said mobile terminal apparatus over said selected second radio channel;

connection means for connecting said first radio link to said second radio link, and establishing a communication link between one of said base stations and said mobile terminal apparatus;

first communication means for sending and receiving a communication signal to and from said one of said base stations through said first radio link; and second communication means, having a transceiver which is used in common by said first communication means, for sending and receiving a communication signal to and from said mobile terminal apparatus through said second radio link.

* * * * *